US010674319B1

(12) United States Patent
Chandra Mondal et al.

(10) Patent No.: US 10,674,319 B1
(45) Date of Patent: Jun. 2, 2020

(54) METHOD AND SYSTEM FOR FEDERATING LOCATION OF POINT OF EMERGENCY ACROSS NETWORKS

(71) Applicant: Wipro Limited, Bangalore (IN)

(72) Inventors: Subhas Chandra Mondal, Bangalore (IN); Vishal Kumar Pandey, Patna (IN); Pallavi Suresh Mastiholimath, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/276,648

(22) Filed: Feb. 15, 2019

(30) Foreign Application Priority Data

Dec. 26, 2018 (IN) .............................. 201841049217

(51) Int. Cl.
*H04M 9/00* (2006.01)
*H04W 4/029* (2018.01)
*G01S 5/02* (2010.01)
*H04M 1/725* (2006.01)

(52) U.S. Cl.
CPC ........... *H04W 4/029* (2018.02); *G01S 5/0231* (2013.01); *G01S 5/0289* (2013.01); *H04M 1/72536* (2013.01)

(58) Field of Classification Search
CPC ..... H04W 12/06; H04W 4/023; H04W 4/029; H04W 4/40; H04W 4/50
USPC ..... 455/404.2, 456.3, 456.1, 456.6, 411, 437
See application file for complete search history.

(56) References Cited

U.S. PATENT DOCUMENTS

| 6,892,169 B1* | 5/2005 | Campbell ............... H04L 41/00 370/361 |
| 8,249,547 B1 | 8/2012 | Fellner |
| 8,275,352 B2 | 9/2012 | Forstall et al. |
| 8,718,596 B1 | 5/2014 | Xue et al. |
| 9,380,144 B1 | 6/2016 | Kritt et al. |
| 9,386,414 B1 | 7/2016 | Mayor et al. |
| 9,650,039 B2 | 5/2017 | Hocking et al. |

(Continued)

FOREIGN PATENT DOCUMENTS

WO 2014209759 A1 12/2014

OTHER PUBLICATIONS

Evangelos K. Markakis Efficient Next Generation Emergency Communications over Multi-Access Edge Computing Published on Nov. 2017.*

Primary Examiner — Joseph Arevalo
(74) Attorney, Agent, or Firm — Finnegan, Henderson, Farabow, Garrett & Dunner, LLP

(57) ABSTRACT

A method and system for federating location of a point of emergency across a plurality of networks is disclosed. The method includes receiving, by a Location Service Orchestrator (LSO), an emergency alert from a User Equipment (UE), wherein the UE is communicatively coupled with a first network from the plurality of networks. The method further includes determining, by the LSO, a location of the UE based on the received emergency alert. The method includes refining, by the LSO, the determined location based on a network initiated location determination mechanism of the first network, when the accuracy of determined location of the UE is below a pre-defined threshold for locational accuracy. The method further includes federating, by the LSO, the refined location of the UE across the plurality of networks.

27 Claims, 13 Drawing Sheets

(56) References Cited

U.S. PATENT DOCUMENTS

| | | | |
|---|---|---|---|
| 2002/0073393 A1* | 6/2002 | Campbell | H04L 45/00 716/119 |
| 2008/0136151 A1* | 6/2008 | Hattori | B60R 21/017 280/735 |
| 2008/0152092 A1 | 6/2008 | Barton et al. | |
| 2014/0376414 A1 | 12/2014 | Edge et al. | |
| 2014/0378089 A1 | 12/2014 | Monros | |
| 2017/0180540 A1 | 6/2017 | Shaw et al. | |
| 2018/0054721 A1* | 2/2018 | Choe | H04W 4/90 |
| 2018/0139788 A1 | 5/2018 | Jhunjhunwala et al. | |
| 2018/0247312 A1* | 8/2018 | Loganathan | G06Q 20/32 |

* cited by examiner

METHOD AND SYSTEM FOR FEDERATING LOCATION OF POINT OF EMERGENCY ACROSS NETWORKS

TECHNICAL FIELD

This disclosure relates generally to determining location of point of emergency and more particularly to method and system for federating location of point of emergency across networks.

BACKGROUND

Cellular wireless network provides emergency services using the location information of a user Equipment (UE) that triggered the emergency service. The emergency may arise from an accident, natural disaster, asset theft, an intentional crime or harm to the person in emergency. It is of utmost importance to determine the accurate location of the UE in order to provide relief to the person in emergency. The current wireless networks, which include cellular and wireless Local Area Network (LAN), provides a mechanism to trigger emergency calls by dialing a special number, for example, 911 or 112 etc. However, the current techniques lack the ability to accurately determine the location of the UE when it is out of coverage from a parent service provider.

In some conventional systems, a UE may move to an area that is out of the coverage area of the parent network, when an emergency occurred. The area is provided coverage from other service providers, but the UE may not be authorized to attach. In this scenario, the other service provider network may allow the emergency call, but location determined for the UE accuracy may not be accurate. Additionally, the only help available to the person in emergency is the action that a Public-Safety Answering Point (PSAP) personnel may take. Examples of the actions may include, but are not limited to, sending a police officer or deploying any other available relief mechanisms. However, people near the UE that triggered the emergency may not get an opportunity to take part in helping the affected person due to the lack of a mechanism to federate the location information and seek help from nearby people.

In some other conventional systems, a UE may not be attached to any network, but there is network coverage from service providers where the UE is not authorized to attach. In this scenario, the available service provider network may allow the emergency call, but location determined for the UE may not be accurate. In a similar manner, a UE may not be under the coverage area of any cellular wireless networks, however, a Wireless-Fidelity (Wi-Fi) network may be present. In this scenario, the Wi-Fi network may allow the emergency call, but location determined for the UE may not be accurate. These conventional systems have the same problems as the conventional systems discussed above.

Thus, there is a need amongst the conventional systems and mechanisms to determine accurate locate of a UE that triggers an emergency call and allow collaborative processing of the same in order to address the emergency.

SUMMARY

In one embodiment, a method of federating location of a point of emergency across a plurality of networks is disclosed. The method includes receiving, by a Location Service Orchestrator (LSO), an emergency alert from a User Equipment (UE), wherein the UE is communicatively coupled with a first network from the plurality of networks. The method further includes determining, by the LSO, a location of the UE based on the received emergency alert. The method includes refining, by the LSO, the determined location based on a network initiated location determination mechanism of the first network, when the accuracy of determined location of the UE is below a pre-defined threshold for locational accuracy. The method further includes federating, by the LSO, the refined location of the UE across the plurality of networks.

In another embodiment, a system that includes an LSO for federating location of a point of emergency across a plurality of networks is disclosed. The system includes a processor; and a memory communicatively coupled to the processor, wherein the memory stores processor instructions, which, on execution, causes the processor to receive an emergency alert from a User Equipment (UE), wherein the UE is communicatively coupled with a first network from the plurality of networks. The processor instructions further cause the processor to determine a location of the UE based on the received emergency alert. The processor instructions cause the processor to refine the determined location based on a network initiated location determination mechanism of the first network, when the accuracy of determined location of the UE is below a pre-defined threshold for locational accuracy. The processor instructions further cause the processor to federate the refined location of the UE across the plurality of networks.

In yet another embodiment, a non-transitory computer-readable storage medium having stored thereon, a set of computer-executable instructions for federating location of a point of emergency across a plurality of networks, which upon execution cause a computer comprising one or more processors to perform steps comprising: receiving an emergency alert from a User Equipment (UE), wherein the UE is communicatively coupled with a first network from the plurality of networks; determining a location of the UE based on the received emergency alert; refining the determined location based on a network initiated location determination mechanism of the first network, when the accuracy of determined location of the UE is below a pre-defined threshold for locational accuracy; and federating the refined location of the UE across the plurality of networks.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
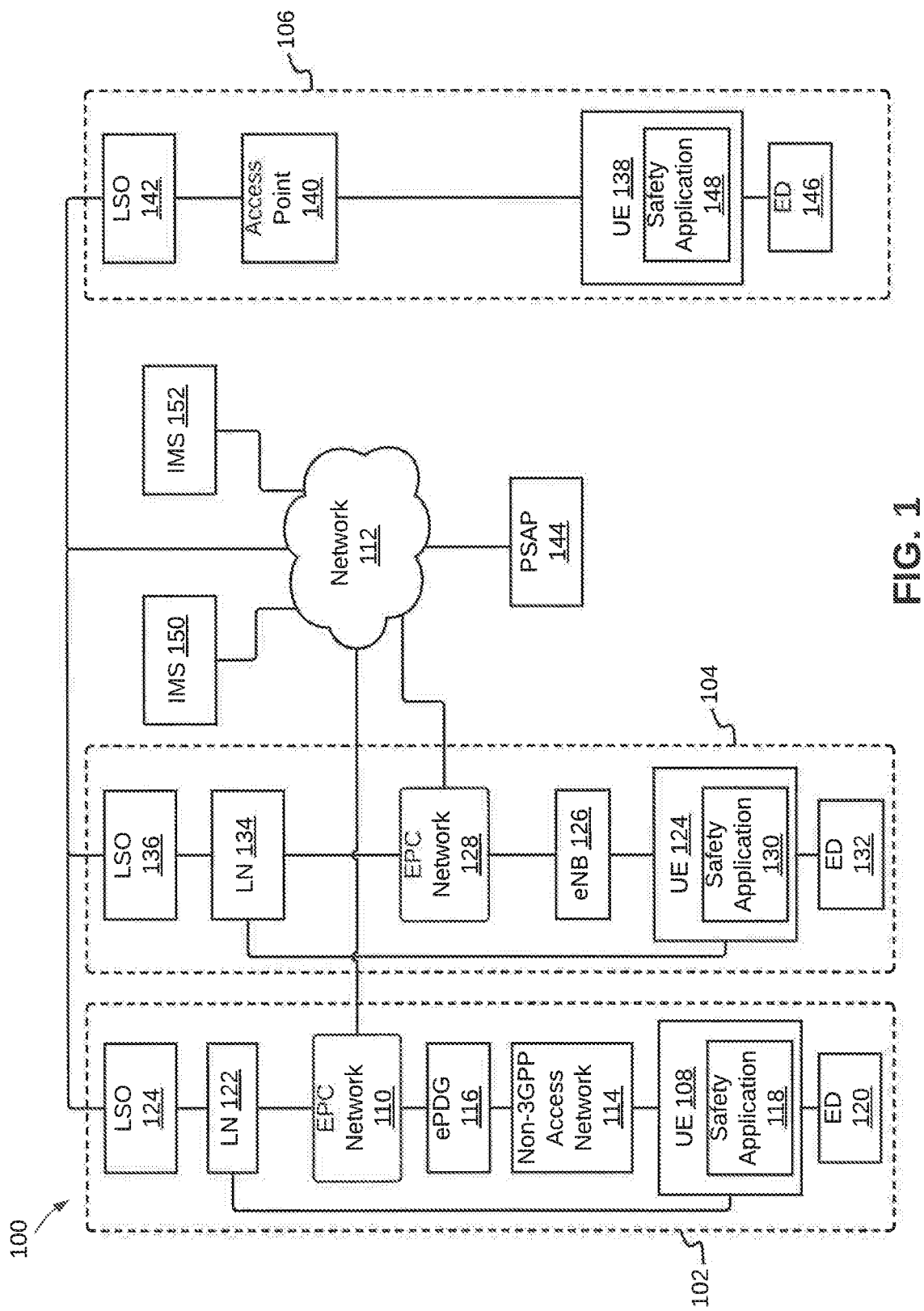
FIG. 1 illustrates a system for federating location of a point of emergency across a plurality of networks, in accordance with an embodiment.

Additional illustrative embodiments are listed below. In one embodiment, a system 100 for federating location of a point of emergency across a plurality of networks is illustrated in FIG. 1, in accordance with an embodiment. The system 100 depicts system elements distributed based on three implementations, i.e., implementation 102, an implementation 104, and an implementation 106, In the implementation 102, a User Equipment (UE) 108 accesses an Enhanced Packet Core (EPC) network 110. The UE 108 may be an end user mobile device that has capability to connect with the Internet through cellular and/or Wi-Fi access networks.

The EPC network 110 is a 3rd Generation Partnership Project (3GPP) core network, through a non-3GPP interface. The EPC network 110 may be the core entity of a network 112, which may be a cellular wireless network, for example, Fourth Generation (4G) and Fifth Generation (5G) networks, that provides mobility management and packet processing capabilities by managing both control and data path of the sessions coming from a radio access network. The EPC network 110 may include a Mobility Management Entity (MME) (not shown in FIG. 1), a Home Subscriber Server (HSS) (not shown in FIG. 1), a Serving-Gateway (SGW) (not shown in FIG. 1), and a Packet Data Network-GW (PGW) (not shown in FIG. 1). These component are further explained in detail in conjunction with FIG. 3 to FIG. 5.

In the implementation 102, the UE 108 is attached to the EPC network 110 through a non-3GPP access network 114 and an Enhanced Packet Data Gateway (ePDG) 116. It will apparent to a person skilled in the art that the ePDG 116 may be replaced by a Packet Data Gateway (PDG). The non-3GPP access network 114 may be an Internet Protocol (IP) network that includes wired and/or wireless access capability. The wireless access network may adhere to wireless access network standard, which may include, but are not limited to IEEE 802.11 or IEEE 802.16. An IP enabled device may be able to exchange information using the non-3GPP access network 114.

An emergency call may be triggered from the UE 108 through the non-3GPP access network 114 and the emergency call may be processed by the EPC network 110. The emergency call may be triggered by a safety application 118 installed in the UE 108. The safety application 118 periodically registers location coordinates of the UE 108 (using GPS, for example) and caches this information for a configurable period of time. The safety application 118 may be configured to augment the cached antecedent location information of the UE 108 with emergency trigger message (which may be shared only during emergency). In the event of cellular connection loss of the UE 108, the safety application 118 may be configured to collect location determined by the UE 108 based on a preset periodicity and may share this location information along with timestamp upon re-establishment of connection of the UE 108. The safety application 118 may be configured to retrigger an emergency, in case some other features are available (for example, network availability, or better GPS accuracy). The safety application 118 may be further configured to trigger an emergency call using advanced methods, such as, Human Computer interaction that may include, but is not limited to, gesture sensing or voice recognition.

Alternatively, the emergency call may be triggered by an External Device (ED) 120 that is communicatively coupled to the UE 108 based on a communication protocol. Examples of the communication protocol, may include, but are not limited to Bluetooth, Wireless-Fidelity (Wi-Fi), Near Field Communication (NFC), or Zigbee, D2D with PC5 interface. In an embodiment, the safety application 118 may be configured to receive and forward the emergency request triggered by the ED 120.

In an exemplary scenario, the emergency call may be seeking help from emergency service handling agency, such as a Public Safety Access Point (PSAP), law enforcement agency, medical services, and the like. In an embodiment, the UE 108 may determine its location, whenever it is prompted by the safety application 118 or the ED 120. For this purpose, the UE 108 may use a supported feature, for example, Global Positioning System (GPS), Wi-Fi access point-based triangulation, Global Navigation Satellite System (GNSS). The UE 108 may thus share this location information in an emergency trigger message sent with the emergency call.

A Location Node (LN) 122, which is communicatively coupled to the UE 108, may compute location information associated with the UE 108. The LN 122 may be a Multi-access Edge Computing (MEC) safety application server or a non-MEC safety application server which supports the location information processing. The safety application 118 may also have authorization to interact with the LN 122, which may be the MEC safety application server or the non-MEC safety application server. In the event of availability of more accurate location of the UE 108, for example, through GPS, the safety application 118 may communicate the same to the LN 122.

MEC is a technology that provides cloud-computing capability within the radio access network, thereby, eliminating the need to transport a large volume of data through expensive transport network to the core. MEC enables implementation of mobile edge applications as software-only entities that run on top of a virtualization infrastructure, which is located in or close to the network edge.

When the LN 122 is a MEC safety application server, an MEC safety application, running on the mobile edge host, leverages the exposed APIs of an MEC location service to garner the location information of one or more UEs, including the UE 108. The MEC safety application may perform the functions that include, but are not limited to, receive a trigger from the UE 108, query for the location and assistance data about the UE 108, query for the antecedent location coordinates of the UE 108, query for location information about users of other service providers who are in the proximity of the UE 108 (who may be a victim), refine the location of the UE 108 and predict future location of the UE 108, generate a list of suspects and federate these information to other MEC hosts in the vicinity, and report to an a Location Service Orchestrator (LSO) 124 and share required information when UE 108 loses network connection, i.e., whenever the UE 108 sends RRC connection re-establishment request. This is used by the LSO 124 for network blind zone calculation.

However, when the LN 122 is a non-MEC safety application server, a non-MEC safety application may be hosted on a cloud server, on a standalone server, or in the LSO 124, The non-MEC safety application may provide the functionalities that include, but are not limited to, receiving an emergency request and information shared by the UE 108 during emergency, interact and query the location service in 4G/5G (for example, the Gateway Mobile Location Centre (GMLC) to garner location information about the UE 108, interacting and querying the location service to garner antecedent registered location coordinates of the UE 108, querying information about the coordinates of the radio nodes, refining the location of the UE 108 and predicting future locations of the UE 108, finding a list of UEs in a defined proximity (for example, within a radius of 5 km from a central point), querying for location information about users of other service providers, who are in the proximity of the UE 108, which is the victim, generating a list of suspects and federate these information, via the LSO 124 to other service provider safety application server in the vicinity, triggering a request for help, along with the location coordinates of the UE 108 (which is a victim) to users in a given proximity.

The LN 122 may further be connected to the LSO 124, which plays the central role in federating location information of the UE 108. To this end, the LSO 124 may utilize available location technologies in cellular and/or non-cellular network, which may include Wi-Fi networks or wired IP networks. In an embodiment, the UE 108 may also initiate an Real-time Transport Protocol (RTP) session with the LSO 124 to share a recorded voice during emergency. The LSO 124 federates the location information of the UE 108 to neighboring LSOs via an LSO-Gateway (GW) (not shown in FIG. 1) and may connect to the network 112. Functionalities of the LSO 124 are further explained in detail in conjunction with FIG. 2.

In an embodiment, the safety application 118 may register the location of the UE 108, when the UE 108 loses network connection, i.e., whenever the UE 108 sends Radio Resource Control (RRC) connection re-establishment request. The safety application 118 may also register the location of the UE 108, when the UE 108 regains its network connectivity. The safety application 118 may share these two locations, when the UE 108 loses and regains its network connectivity with the LSO 124. The LSO 124 maintains a record of the network blind zones, and uses this information to augment the record. Additionally, the safety application 118 may start an RTP session with the LSO 124 in order to share a recorded voice during emergency.

In the implementation 104, a UE 124 is attached to the network 112, which is a 3GPP network that may be implemented based on an Evolved Node B (eNB) 126 and an EPC network 128, which is similar in functionalities to the EPC network 110. When an emergency is triggered from the UE 124, the processing of emergency call is handled completely by the network 112. The emergency call may be triggered by a safety application 130 installed in the UE 124 or an ED 132 that may be communicatively coupled to the UE 124. The implementation 104, further includes a LN 134 communicatively coupled to the UE 124 and to an LSO 136. The LSO 136 is further communicatively coupled to the network 112. The LN 134 performs same functionalities as the LN 122 and the LSO 136 performs same functionalities as the LSO 124.

In the implementation 106, which is for a non-cellular IP network, a UE 138, which is a non-3GPP UE, is connected to the Internet through an access point 140 of a non-3GPP access network, which may be wired and/or wireless Local Area Network (LAN) network (for example, Digital Subscriber Line (DSL) or Wi-Fi). The UE 138 may support both active and passive scanning of access points. A person of ordinary skill in the art will appreciate that during an active scan, the UE 138 may transmit a probe request and listen for a probe response from an access point; and during a passive scan, the UE 138 may listen on each channel for beacons sent periodically by an access point.

An emergency call triggered from the UE 138 is routed through the access point 140, to a central LSO 142, which provides the emergency services to the UE 138. To this end, the LSO 142 may coordinate with a Public Safety Answering/Access Point (PSAP) 144. The UE 138 may have device ID (i.e., Media Access Control (MAC) Address) using which, the UE 138 gets authorized with the LSO 142. The authorization related information for the UE 138 is stored in an authorization database (not shown in FIG. 1) in the LSO 142. The LSO 142 may also store contact information (cell phone number, email id, address, emergency contact number) of the owner of the UE 138. The UE 138 may also support initiation of an RTP session with the LSO 142, to share a recorded voice during emergency.

The emergency call may be triggered by an ED 146 communicatively coupled to the UE 138. Alternatively, the emergency call may be triggered by a safety application 148, which only works on Wi-Fi, running in the UE 138. The safety application 148 may collect and store Received Signal Strength Indicator (RSSI) values, MAC address, and/or location information of each access point from which it is receiving signal, in addition to the access point 140. The safety application 148 may also enable the UE 138 to send a broadcast message to each access point, which is reachable to the UE 138.

The PSAP 144 may correspond to a call center that may be obliged to answer the emergency call. The PSAP 144 may identify location of a call initiated from a landline as well as a mobile phone. The PSAP 114 may include multiple Answering Point Units (APUs), for example, between 2 and 12 APUs, that receive the emergency calls. An APU shows the name, address and number for a landline call. However, for a wireless call, the APU may display address of the wireless tower that delivers the call, mobile number and the estimated location of the caller.

The system 100 further includes one or more IP Multimedia Subsystems (IMSs) (for example, an IMS 150 and an IMS 152). An IMS is a core network solution that provides a rich real-time IP based communication services for a connected UE over any access network. The IMS works seamlessly across access networks, for example, Long Term Evolution (LTE) and Wi-Fi, which makes it reliable for emergency scenarios. During an emergency trigger made by a UE, when the call reaches the IMS (for example, one of the IMS 150 or the IMS 152), the IMS forwards the call to the nearest PSAP center based on the provided location.

The IMS has a registration mechanism and all UEs are required to comply with the same. An unregistered UE that wants to make an IP based call/Short Messaging Service (SMS) must complete registration with the roaming/home network and continue with the session. During registration, in the case of emergency, if the UE is unable to provide required credentials, UE may mention "emergency" and "anonymous" in the emergency request call. This enables the IMS to bypass verification of credentials. Thereafter, the IMS may directly forward the call to the nearest PSAP.

The system 100 may not be limited to the above discussed networks and may be implemented for any new type of access technologies, for example, Fifth Generation (5G) new Radio, Light Fidelity (LiFi) as defined in IEEE 802.15-7, or Optical Camera Communication (OCC).

Figure 2:
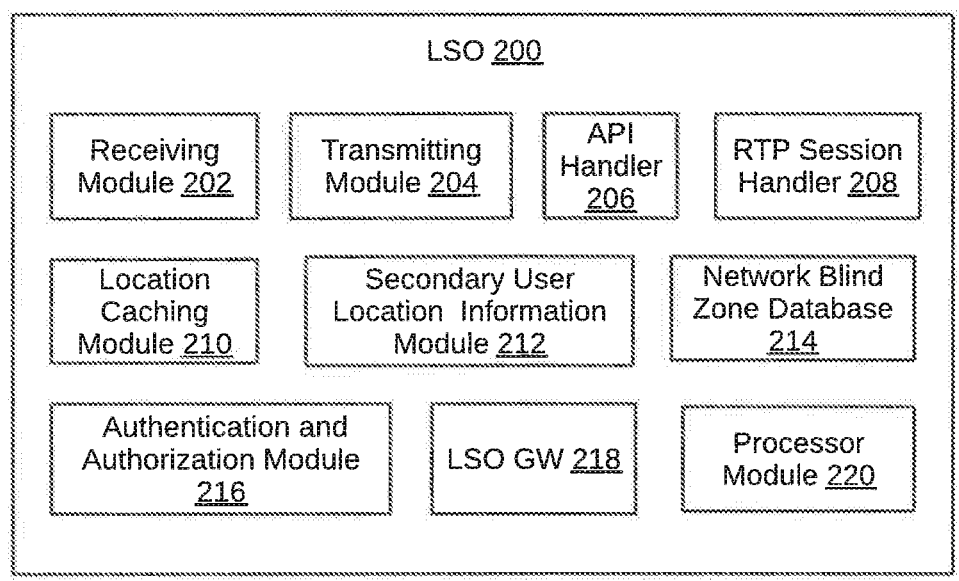
FIG. 2 illustrates a block diagram depicting various modules within a Location Storage Orchestrator (LSO), in accordance with an embodiment.

Referring to FIG. 2, a block diagram of various modules within an LSO 200 is illustrated, in accordance with an embodiment. The LSO 200 is analogous to each of the LSO 124, the LSO 136, and the LSO 142. The LSO 200 plays a central role for federating the location information of a UE, for example, UE 108. The LSO 200 federates the location information to its neighboring LSOs via an LSO-GW (not shown in FIG. 2). The LSO 200 is configured to receive the location information from pre-authorized MEC application servers and non-MEC application servers, via the LSO-GW. The LSO 200 handles the authorization and authentication required for federating the location information across the neighboring LSOs. A Transport Layer Security (TLS) protocol may be used in communication between the LSO 200 and the MEC/non-MEC application servers. The LSO 200 and associated MEC/non-MEC Safety application servers (as described in FIG. 1) may adhere to the TLS authorization and authentication procedures and may successfully complete the TLS handshaking procedure in prior to exchange of information. The LSO-GW routes the IP packets to the destination LSO using gateway protocols. In an embodiment, Border Gateway Protocol (BGP) may be used. However, implementation with any other suitable routing protocol is also within the scope of the invention.

The LSO 200 is responsible for the functionalities that include, but are not limited to, interacting with the MEC/non-MEC safety application server to receive location information of a UE (who may be a victim) and federate this information across service providers, via, the LSO-GW, maintaining a database of geographical coordinates of radio nodes and yield this information when queried by the MEC/non-MEC safety application server, establishing (optionally) an RTP session with the UE 108 or the UE 138 to receive real-time audio feed, or identification of network blind zones. The LSO 200 also collects location when a UE has no network coverage from service providers, maps this onto the topography of the area to identify a network blind zone. The LSO 200 stores this information in a database and shares it with the MEC/non-MEC safety application server during emergency.

When a request is made by the MEC/non-MEC safety application server, the LSO 200 may query service providers for location information of users who were in proximity of a UE that triggered the emergency call. Thereafter, the LSO 200 shares this information with the requesting safety application, i.e., the MEC/non-MEC safety application server of a parent service provider of the UE.

Specifically, for the implementation 106, the LSO 200 may receive an emergency trigger from an IP enabled device (for example, the UE 138) and federate this information across all service providers via the LSO-GW. The LSO 200 in this case may also initiate a call to the PSAP 144, such that, the LSO 200 may use the credentials of the IP enabled device, which were received along with the emergency trigger. The LSO 200 may have details of IMS servers (for example, the IMS 150 and/or 152) of all service providers in the area where the LSO 200 is managing emergency calls. The LSO 200 also converts the emergency information received from the UE 138 into a Session Initiation Protocol (SIP) messaging format. Additionally, the LSO 200 may include a database to authorize a UE that wants to carry out an emergency call.

In an implementation, the LSO 200 may include a memory that includes a receiving module 202, a transmitting module 204, an API handler 206, an RTP session handler 208, a location caching module 210, a secondary user location information module 212, a network blind zone database 214, an Authentication and Authorization module 216, an LSO GW 218, and a processor module 220.

The receiving module 202 receives information from other LSOs. Based on the type of information received, the receiving module 202 may perform one or more of the functionalities that include, but are not limited to, receiving all the location information of UEs under emergency, receiving location data from neighboring LSOs of the UEs in the vicinity of the UE that triggered an emergency and belong to other service providers, and receiving the required data from the UE to determine network blind zones.

The transmitting block 204 federates the information to other LSOs. The transmitting block 204 receives the location data from its corresponding MEC/non-MEC safety application server, which needs to be broadcasted to neighboring LSOs. The API handler 206 handles API calls made by any client (for example, the MEC safety application server or the non-MEC safety application server) to the LSO 200. The API handler 206 is also responsible for receiving a request (for example, a Hyper Text Transport Protocol (HTTP) request) and returning a response (for example, a HTTP response). The RTP session handler 208 establishes an RTP session between the UE 108/UE 138 and the LSO 200, once an emergency is triggered. This session will assist the LSO 200 in receiving real-time audio and/or video samples from the UE 108/UE 138 during emergency. The collected information may then be forwarded to the concerned authorities (such as the PSAP 144) to assist in handling the emergency.

The location caching module 210 stores geographical coordinates of radio nodes and provides this information to a safety application. The secondary user location information module 212 stores the information of all UEs that belong to the current Service Provider that are in the vicinity of the emergency area. This secondary user list is generated by the MEC/non-MEC safety application server considering the emergency location it received. The LSO 200 then shares this information with neighboring LSOs when queried for.

The network blind zone database 214 is used to store the information about those geographical areas which are not under the coverage of a service provider. Whenever a UE reports about an area that does not have coverage from a service provider, it is stored in the network blind zone database 214. The MEC/non-MEC safety application server may fetch data from the network blind zone database 214 to find network blind zones in the vicinity of an emergency and use this information in handling the emergency call. This information may also be used by the service providers for network optimization.

The authentication and authorization module 216 handles authorization to facilitate publish-subscribe messaging with the Gateway Mobile Location Centre (GMLC) and the MEC. The LSO 200 may support the authorization procedures for all UEs (UE 108 and UE 138, for example) with safety applications and facilitate them during emergency. The authentication and authorization module 216 also verifies a UE which would want to connect to an IMS in the implementation 106.

The LSO GW 218 handles routing of emergency call location information. The LSO 200 may federate and receive the information through the LSO GW 218. The LSO GW 218 utilizes TLS protocol in its transport layer to publish subscription with the MEC/non-MEC safety application server. The LSO GW 218 implements the gateway routing protocol in order to route the packets between the LSO 200 and a client. The LSO GW 218 may be implemented as a functional block inside the LSO 200 or as a separate central entity which orchestrate the federation of information between multiple LSOs.

The processor module 220 has computation capabilities to run algorithms which may include, but are not limited to, identification of network blind zones based on the statistical data received by the receiving module 202, determining LSOs to query for supplementary data depending on location of a UE in emergency, generating a list of secondary user location information, and determining the correct IMS server to which the SIP messages must be sent in the implementation 106.

The LSO 200 and the modules therein may be implemented either by hardware, software, or combinations of hardware and software. Similarly, The LSO 200 and the modules therein may be implemented as Application Specific Integrated Circuits (ASICs) or Field-Programmable Gate Array FPGA configured to perform some or all of aforementioned functionalities described for the LSO 200.

Figure 3:
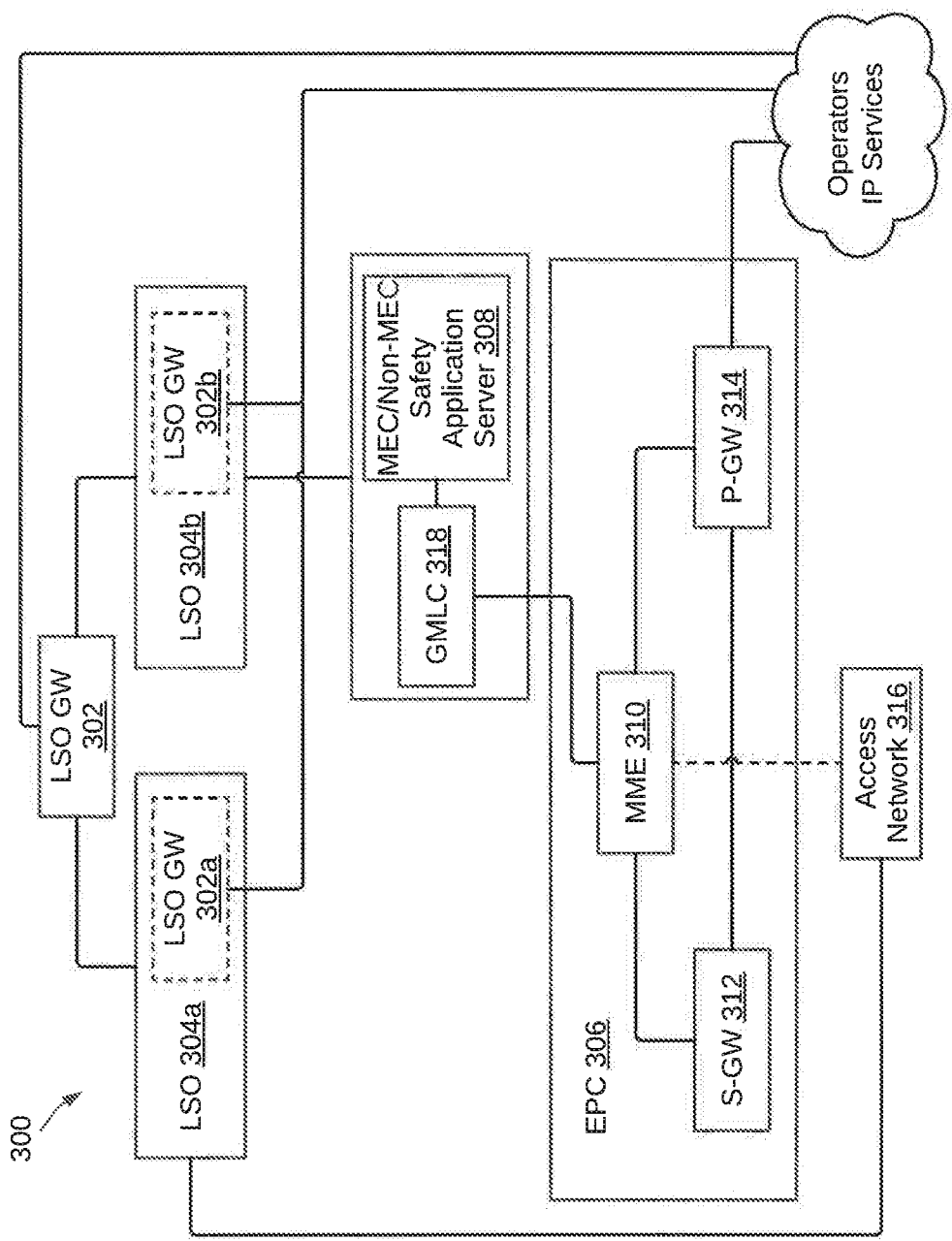
FIG. 3 illustrates a block diagram depicting two implementations of an LSO Gateway (GW), in accordance with an embodiment.

Referring now to FIG. 3, a block diagram 300 depicting two implementations of an LSO GW 302 is illustrated, in accordance with an embodiment. The block diagram 300 includes further includes an LSO 304a and an LSO 304b, which may communicate with each other through the LSO GW 302. In a centralized implementation of the LSO GW 302, there is just a single LSO GW. In a distributed implementation of the LSO GW 302 may be implemented as functional blocks. The LSO 304a includes an LSO GW 302a and the LSO 304b includes an LSO GW 302b. Both these implementations have been depicted in FIG. 3, however, one of these implementations may be employed by the LSOs 304a and 304b.

The centralized implementation, the LSO GW 302 manages routing of location information between the LSOs 304a and 304b. The LSOs 304a and 304b require an additional interface to connect with the LSO GW 302 and need to complete an authorization procedure with the LSO GW 302. After completion of the registration procedure, the LSOs 304a and 304b may be able to transmit and receive location information from the LSO GW 302. The number of LSOs under the LSO GW 302 may be decided by the service provider.

An Evolved Packet Core (EPC) 306 serving a geographical area may have an associated MEC/non-MEC safety application server 308. The MEC/non-MEC safety application server 308 may be a part of the LN 134 depicted in FIG. 1. In an implementation, the EPC 306 includes an MME 310, an S-GW 312, and an P-GW 314. The number of MEC/non-MEC safety application servers needed in for one EPC may be decided by a service provider. The MEC/non-MEC safety application server 308 may be connected to an access network 316 via a GMLC 318 or may be located in-between an eNB (not shown in FIG. 3) and the EPC 306. In an embodiment, the MEC/non-MEC safety application server 308 may handle multiple eNBs and the number eNBs may be fixed by the service provider. Location information of all UEs connected to an eNB are managed by the MEC/non-MEC safety application server 308 under which the eNB is configured. The MEC/non-MEC safety application server 308 may be connected to the LSOs 302a and 302b, which support the MEC/non-MEC safety application server 306 to federate and collect the location related information to/from other LSOs. Any location information that the MEC and/or Safety Application server 308 may want to federate to the LSOs 302a and 302b may be sent via the LSO GW 302.

Figure 4:
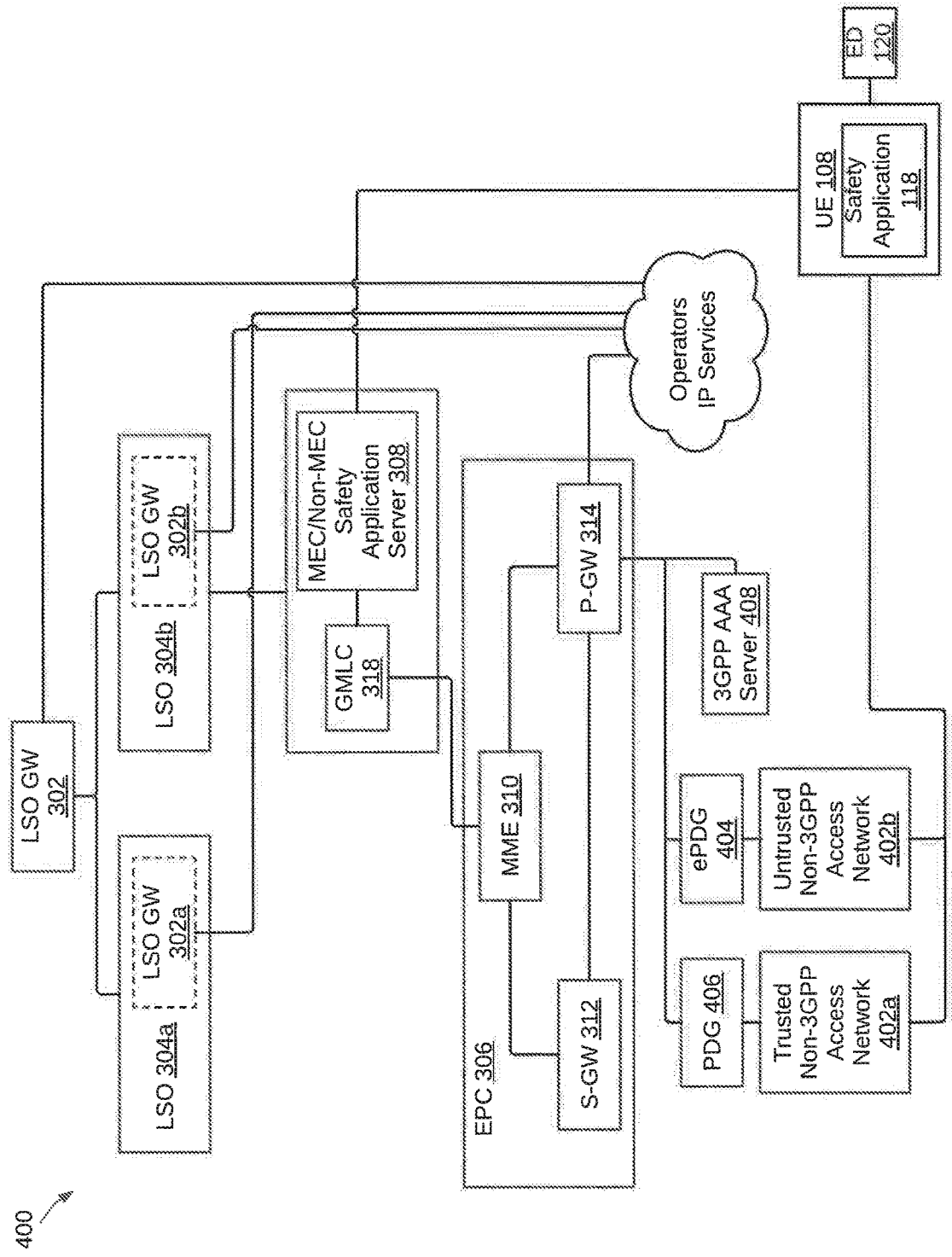
FIG. 4 illustrates a block diagram depicting a first implementation where a UE accesses a cellular network through a non-Third Generation Partnership Project (3GPP) access network, in accordance with an embodiment.

Referring now to FIG. 4, a block diagram 400 depicting the implementation 102 where the UE 108 accesses a cellular network through a non-3GPP access network 114 is illustrated, in accordance with an embodiment. It will be apparent to a person skilled in the art that the block diagram 400 depicts both central and distributed implementation of an LSO-GW, as described in detail in FIG. 3. The UE 108 may be connected to the non-3GPP access network 114 (for example, a Wi-Fi network) that may be a trusted non-3GPP access network 402a or an untrusted non-3GPP access network 402a. The UE 108 may trigger an emergency request, which may be routed through the EPC 306. In this scenario, the UE 108 may support a 3GPP access network as well as the non-3GPP access network 114, using which the emergency trigger is made.

To get access to the EPC 306 for emergency services in case of the trusted non-3GPP access network 402a or the untrusted non-3GPP access network 402a, the UE 108 may attach to either. The UE 108 may then execute the procedure of initial attach via S2a interface for emergency services. On receiving an indication from the UE 108 that a PDN connection for emergency services needs to be established, an ePDG 404 or a PDG 406 search their respective configured emergency configuration data, which may include details of an emergency Access Point Name (APN) to be used to derive a P-GW (for example, the P-GW 314) and/or statically configured P-GW (for example, the P-GW 314) for the emergency APN.

The UE 108 is a modified UE, such that the UE 108 includes the safety application 118. Whenever an emergency call is triggered by the UE 108, which is attached to one of the trusted non-3GPP access network 402a or the untrusted non-3GPP access network 402a, which may be (a WLAN network), the emergency call is handed over to the P-GW 314. The P-GW 314 may then route the call to the nearest PSAP (for example, the PSAP 144. Simultaneously, the safety application 118 triggers an emergency to the MEC/non-MEC safety application server 308.

When the UE 108 is attached to the trusted non-3GPP access network 402a, the emergency call may be directly placed onto the P-GW 314 from the APN, without any requirement for authentication. However, when the UE 108 is attached to the non-trusted non-3GPP access network 402b, the emergency call is first sent to a 3GPP Authentication, Authorization, and Accounting (AAA) server 408 for authentication. Once the authentication process has been completed, the call is transferred to the ePDG 404. The emergency call from the PDG 406 or the ePDG 404 is then forwarded to P-GW 314, which then handles the emergency call.

In the implementation 102, the emergency call triggered by the safety application 118 may reach the MEC/non-MEC safety application server 308, which may also receive the location information from the EPC 306, via the GMLC 318. One of the LSO 304b along with the MEC/non-MEC safety application server 308 may handle the emergency call.

Figure 5:
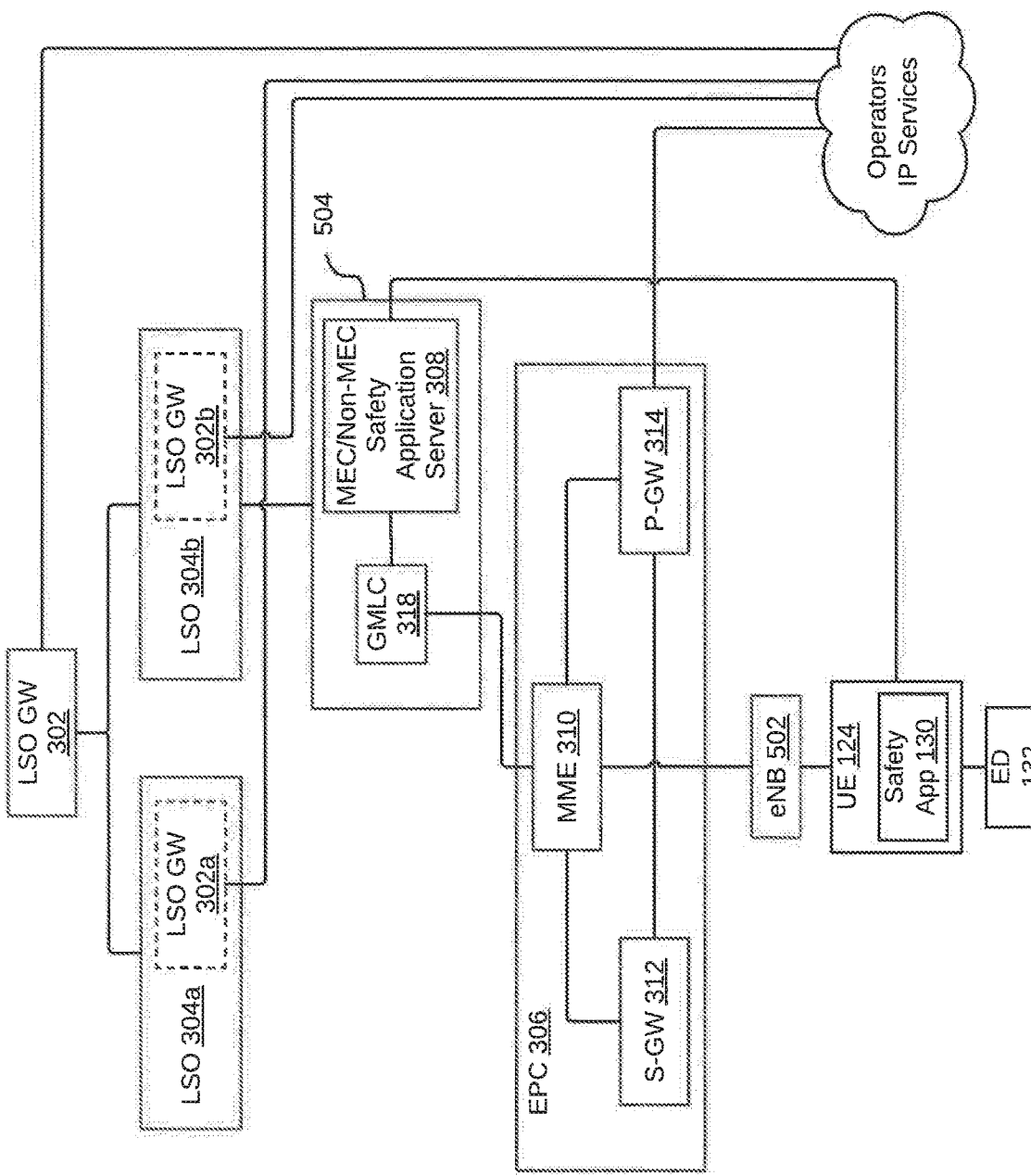
FIG. 5 illustrates a block diagram depicting a second implementation where a UE accesses a cellular network through a 3GPP access network, in accordance with an embodiment.

Referring now to FIG. 5, a block diagram 500 depicting the implementation 104 where the UE 124 accesses a cellular network through a non-3GPP access network 114 is illustrated, in accordance with an embodiment. It will be apparent to a person skilled in the art that the block diagram 500 depicts both central and distributed implementation of an LSO-GW, as described in detail in FIG. 3.

In this scenario, the UE 124 is connected to an access network that may be E-UTRAN and the core network is the EPC 306. The UE 124 may trigger an emergency call using the safety application 130 installed in the UE 124. An emergency call may be triggered either by the UE 124 or by ED 132, by latching the safety application 130, for example. The UE 124 is connected to an eNB 502, via a radio access network and the EPC 306.

When an emergency call is made using either the UE 124 or the ED 132, the emergency call is carried by the E-UTRAN and the call is processed by the EPC 306. The emergency related location information is obtained by a LN 504 and the LSO 304b. As depicted in FIG. 5, the LN 504 may support either the MEC based E-UTRAN cellular architecture or the non-MEC E-UTRAN cellular architecture. This is represented by the MEC/Non-MEC safety application server 308.

In the MEC based E-UTRAN cellular architecture, the MEC safety application server 308 in the LN 504 may get the radio information by using publish and subscribe model. The emergency trigger information is routed to an MEC safety application by an MEC Platform in the MEC safety application server 308. Alternatively, the trigger is made to the MEC safety application server 308 by the safety application 130. Whenever an emergency call is made by the UE 124 or the ED 132, the emergency call is routed to the MEC safety application server 308. Along with this emergency call, the safety application 130 may share information that may include, but is not limited to, current location or previous locations of the UE 124 with the MEC safety application server 308. The MEC safety application server 308 uses this information for analytics. The MEC safety application server 308 may query any location related information from the EPC 306, via the GMLC 318. Once the analysis is completed, the processed data is forwarded to the LSO 302b, which will be broadcasting this information to its neighboring LSOs, for example, the LSO 302a.

In the non-MEC based E-UTRAN cellular architecture, whenever an emergency call is made from the UE 124 or the ED 132, the emergency call is sent to the non-MEC safety application server 308, via the safety application 130. Along with the emergency call, the safety application 130 may send the location related information of the UE 124 to the non-MEC safety application server 308. The non-MEC safety application server 308 may then query any location related information from the EPC 306, via the GMLC 318. Once the data analysis is completed, the processed data is forwarded to the LSO 304b, which will be broadcasting this information to its neighbor LSOs, for example, the LSO 304a.

Figure 6:
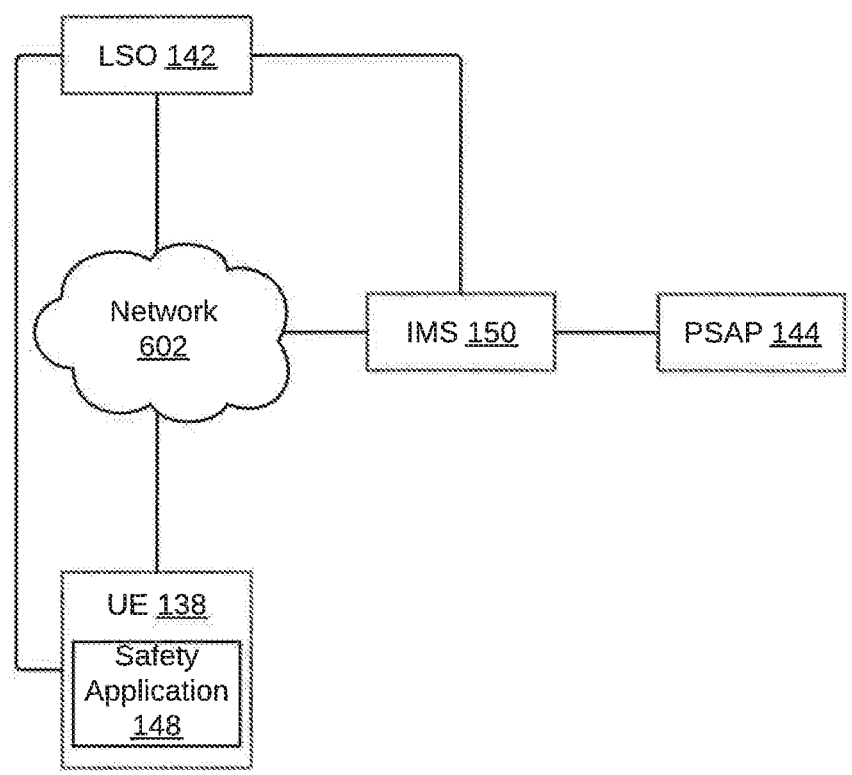
FIG. 6 illustrates a block diagram depicting a third implementation where a UE is connected to a non-3GPP access network, in accordance with an embodiment.

Referring now to FIG. 6, a block diagram 600 depicting the implementation 106 where the UE 138 is connected to a non-3GPP access network 602 is illustrated, in accordance with an embodiment. The UE 138 is an IP enabled device and may be connected to the non-3GPP access network 602, which may be the IP network. The UE 138 includes a device ID (for example, the MAC address of the UE 138) using which the UE 138 gets authorized with the LSO 142 and the authorization related information is stored in an authorization database (not shown in FIG. 6). The LSO 142 may also store contact information (for example, cell phone number, email id, address, or an emergency contact number) of the owner of the UE 138.

The safety application 148 (Wi-Fi only) running in the UE 138 collects and stores one or more of the RSSI values, the MAC address, and the location information of all the APs, from which the UE 138 is receiving beacon frames. The safety application 148 may also enable the UE 138 to send a broadcast message to all the APs which are reachable to the UE 138. The UE 138 may support both active and passive scanning of APs.

To reinforce the location accuracy, the UE 138 may broadcast about an emergency. The information about the emergency may be included in a probe request frame (for example, in the Service Set Identifier (SSID) field) or the UE 138 may send a dummy 802.11 beacon frame, with its SSID field customized to indicate emergency. Based on the two types of broadcast frames two scenarios may be possible. In the first scenario, an AP may identify the emergency probe request frame and may then broadcast emergency in its beacon frame and probe response frame. The other devices listening to the AP's frame, may turn on their hotspots for a predefined period, based on one or more of the beacon frame and probe response frame. The AP may also augment its location in the probe response frame (for example, in the additional SSID column).

In the second scenario, the UE 138 sends a dummy beacon frame and dummy probe response frame indicating an emergency. Based on these dummy frames, the other devices listening to the AP's frame, recognize emergency and turn on their hotspot for a predefined period. These devices may include their location (for example, GPS or cellular) in their beacon and probe response frame (for example, in the additional SSID column). In an embodiment, the other devices may further determine validity of the emergency and may accordingly enable or disable their hotspot. In another embodiment, the other devices may further determine whether the emergency is still valid after expiry of the predefined time period and may accordingly disable their hotspot or keep their hotspot enabled.

When an emergency is triggered by the UE 138, this trigger is routed to the LSO 142 (central LSO) via the non-3GPP access network 602. In its trigger request, the UE 138 may also send the MAC address (and if possible the geographical location) and the corresponding received signal strength of all the APs, from which the UE 138 is receiving beacon frames. When the location of the APs is not sent directly by the UE 138, the LSO 142 may use the database of MAC Address mapped to respective locations, in order to get the geographical location of the APs. Alternatively, the LSO 142 may use the IP location mapping to get the location of the AP.

When the LSO 142 receives this trigger, the LSO 142 authenticates and verifies the UE 138 using the credentials (for example, public identifier number) received along with the emergency call, from its central database. The LSO 142 may then use the information provided in the emergency message to compute the location of the UE 138, by using methods, which may include, but are not limited to triangulation. The LSO 142 may also fetch additional information about a user using a device ID of the UE 138.

The information fetched during emergency trigger are wrapped inside an SIP message format, which may be sent to the IMS 150. The creation of SIP message is managed by LSO 142. The SIP message may include the details that comprise emergency type in the header of the SIP INVITE message, location information of the UE 138 as calculated by the safety application 148, and an SIP Uniform Resource Indicator (URI).

The LSO 142 may have the details of different IMS servers in the emergency area of different service providers. The IMS servers of the service providers and the LSO 142 may already have the agreement of handling the emergency call. The LSO 142 may decide and select an IMS (for example the IMS 150), that would be handling the emergency call. Once the SIP invite is sent to the IMS 150 by the LSO 142, the IMS 150 may now be responsible for the emergency call to reach the nearest PSAP (for example, the PSAP 144) of the area. The service provider whose IMS (for example, the IMS 150) will be used in this case, will be responsible for policies and charging of the emergency call. The UE 138 may optionally initiate an RTP session with the LSO 142 and share recorded voice clips with the LSO 142, to better assist the LSO 142 in providing relief to a victim.

Figure 7:
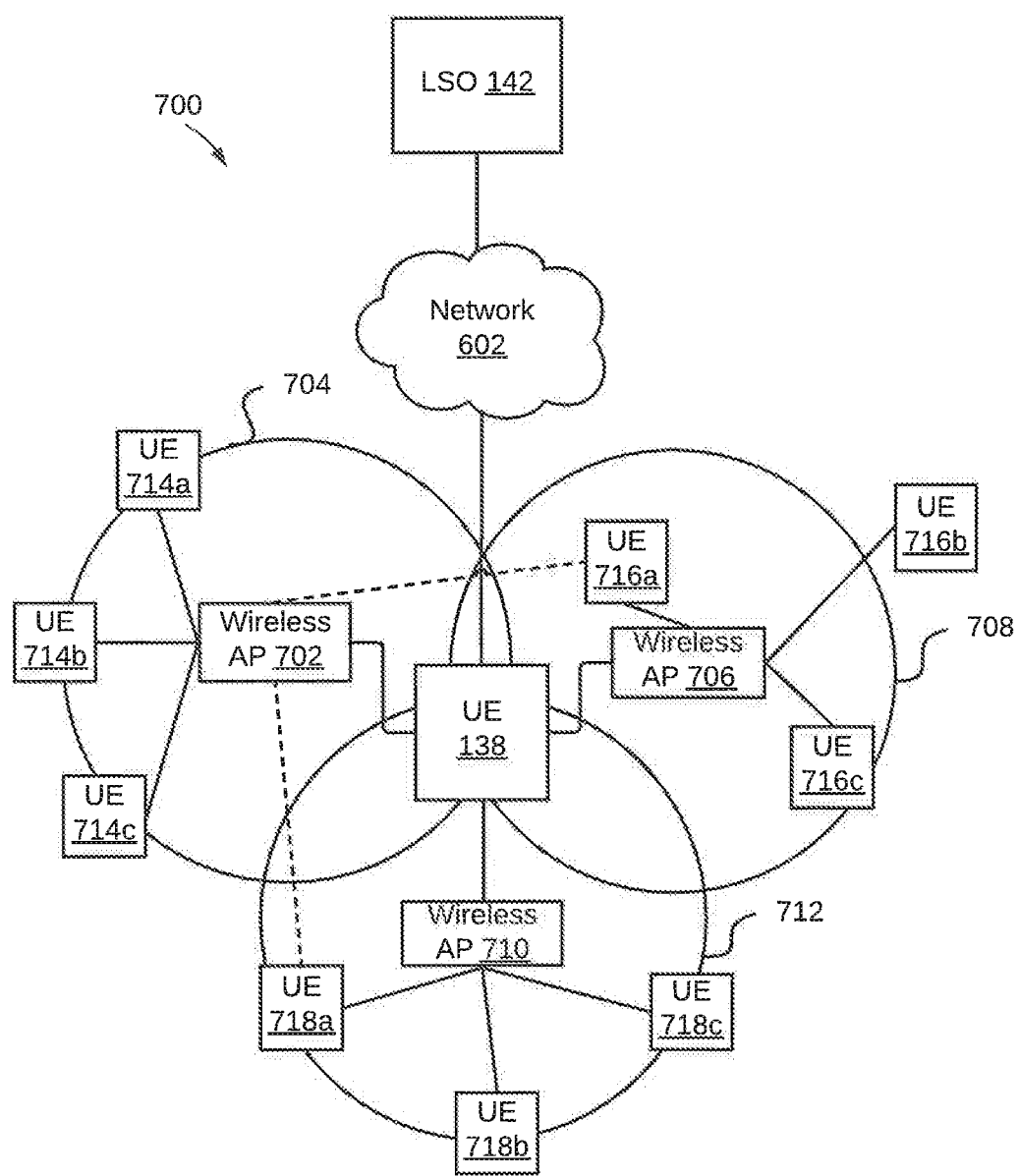
FIG. 7 illustrates a block diagram of an architecture for the third implementation, in accordance with an embodiment.

Referring now to FIG. 7, is a block diagram of an architecture 700 for the implementation 106 is illustrated, in accordance with an embodiment. The network 700 include a wireless AP 702 having a coverage area 704, a wireless AP 706 having a coverage area 708, and a wireless AP 710 having a coverage area 712. The wireless AP 702 is in communication with UEs 714a to 714c, the wireless AP 706 is in communication with UEs 716a to 716c, and the wireless AP 710 is in communication with UEs 718a to 718c. The UEs 714a to 714c, 716a to 716c, and 718a to 718c receive beacon frames from respective wireless APs.

The geographical coordinates of the wireless APs 702, AP 706, and AP 710 are known and geographical coordinates of the 714a to 714c, 716a to 716c, and 718a to 718c may be computed by triangulation based on received signal strength. The UE 138 may be receiving beacon frames from each of the wireless APs 702, AP 706, and AP 710. In an embodiment, the UE 138 may send an emergency trigger to the LSO 142 along with location information augmented in the emergency trigger. Alternatively, one of the wireless APs 702, 704, and 706 may also send a broadcast request for help to their respective connected UEs. The UE 138 may also start an RTP session with the LSO 142 and share the recorded voice clips with the LSO 142.

In an embodiment, the UE 138 may be receiving beacon frames from the wireless AP 702. The UEs 714c, 718a, and 716a may also be receiving signal from the wireless AP 702. When the UE 138 makes an emergency trigger, the trigger may be received by the wireless AP 702, which further requests UEs 714c, 718a, and 716a to start tethering. The UE 138 may detect its location using triangulation based on the received signal strength from the UEs 714c, 718a, and 716a. Optionally, the wireless AP 702 may also send a broadcast request for help to all UEs connected to the wireless AP 702.

In an embodiment, a location of the UE 138 may be estimated using the signal strength the UE 138 is receiving from wireless AP 702. The location of the UE 138 may be estimated using the relation between the signal strength S1 and the distance d1 from the AP 702. Once the location is estimated, the location is shared with the LSO 142 along with emergency trigger message. The distance d1 may be determined using equation 1 given below, which is the Friis transmission equation:

$$P_r = P_t + D_i + D_r + 20\log_{10}\left(\frac{\lambda}{4\pi d}\right) \tag{1}$$

Once the distance, d1, is estimated, the location of the UE 138 will be on the circumference of the coverage area 704 with a radius of d1, with the wireless AP 702 at center. Variables, such as, roll, pitch, and yaw angles of the UE 138 and/or the wireless AP 702 with respect to the horizontal earth may influence the signal strength. These variables may be measured using sensor, such as, accelerometers, gyroscopes, or magnetometers in the UE 138 and/or wireless AP 702. This method may enable estimation of a coarse location of the UE 138.

An accurate location of the UE 138 may be determined based on beacon frames received from at least three wireless APs. During emergency, when only one or two wireless APs are available, UEs that are in vicinity of a wireless AP and are capable of acting as a wireless AP, may be transformed into a wireless AP. To this end, when an emergency is triggered by the UE 138, the UE 138 may send a broadcast message to all wireless APs that are reachable to the UE 138. The emergency trigger may be included in the 802.11 probe request message or the UE 138 may turn into a wireless AP and may broadcast this request in its 802.11 beacon frame or probe response frame. The wireless AP 702 after receiving the message triggers a broadcast message to all the UEs connected to the wireless AP 702. By way of an example, the UEs 714c and the UE 718a may receive the broadcast message from the wireless AP 702 and are capable of acting as wireless APs. Thereafter, each of the UE 714c and the UE 718a start tethering and acting as wireless APs. The location of the UE 138 is then computed using triangulation methodology, based on strength of signal received from the wireless AP 702, the UE 714c, and the UE 718a. Thereafter, the equation (1) described above, is used to compute distance of the UE 138 from each of the wireless AP 702, UE 714c, and UE 718a. As a result, three distances are determined, which are then triangulated to determine the accurate location of the UE 138. The determined location of the UE 138 is then shared with the LSO 142.

In an embodiment, there may be only one or no wireless AP, but the UE 138, which is in emergency, may act as a wireless AP and other UEs near the UE are also capable of acting as wireless AP. By way of an example, the UE 138 may turn into wireless AP once an emergency request is made. The UE 138 may then trigger a broadcast message to each UE (for example, the UE 716a, the UE 716c, and the UE 718a) that is receiving signal from the UE 138. The UE 138 may broadcast this request in its 802.11 beacon frame or probe response frame. Thereafter, the triangulation method described above is used to determine the accurate location of the UE 138. The determined location of the UE 138 is then shared with the LSO 142.

Figure 8:
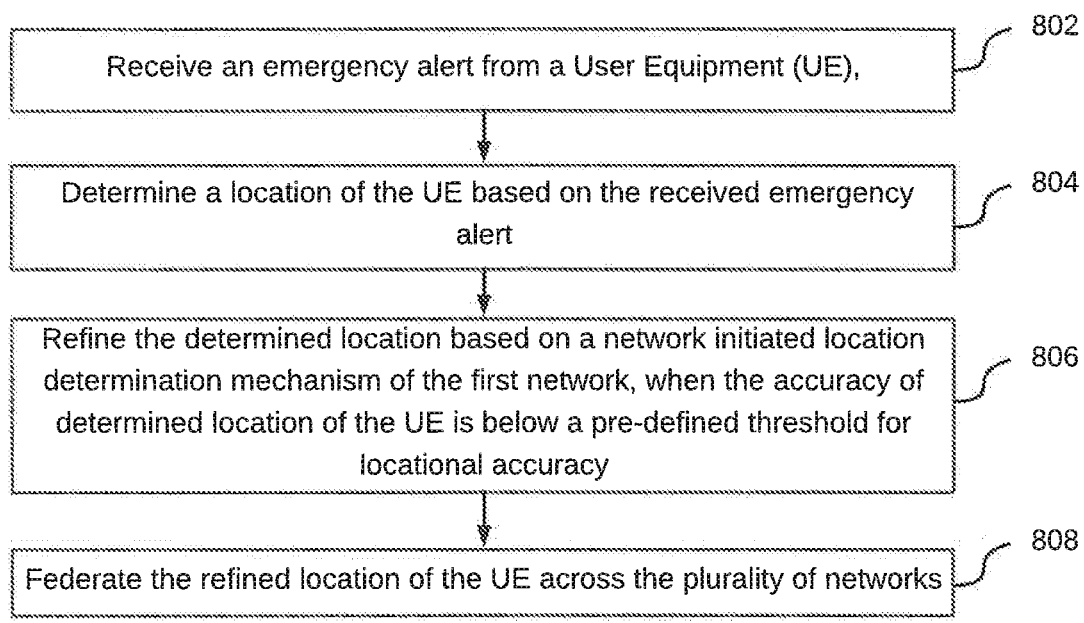
FIG. 8 illustrates a method of federating location of a point of emergency across a plurality of networks, in accordance with an embodiment.

Referring now to FIG. 8, a method of federating location of a point of emergency across a plurality of networks is illustrated, in accordance with an embodiment. At step 802, an LSO receives an emergency alert from a UE, which is communicatively coupled with a first network from the plurality of networks. The first network is one of a 3rd Generation Partnership Project (3GPP) network, a non-3GPP network, and a Wi-Fi network. The emergency alert may be generated by the UE in response to a trigger received from an external device communicatively coupled to the UE. The external device is configured to detect an emergency situation. This has been explained in detail in conjunction with FIG. 1.

At step 804, the LSO determines a location of the UE based on the received emergency alert. The network initiated location determination mechanism is implemented in one of a MEC safety application server and a non-MEC safety application server. At step 806, the LSO refines the determined location based on a network initiated location determination mechanism of the first network, when the accuracy of determined location of the UE is below a pre-defined threshold for locational accuracy. The pre-defined threshold may be defined by an administrator.

Thereafter, at step 808, the LSO federates the refined location of the UE across the plurality of networks. The refined location is federated across the plurality of networks through an LSO-GW associated with the LSO. The LSO-GW may be one of a distributed LSO-GW or a centralized LSO-GW. The distributed LSO-GW is located within an associated LSO and the centralized LSO-GW may be communicatively coupled to LSOs associated with the plurality of networks and facilitates communication amongst the LSOs. The method has already been explained in detail in conjunction with FIG. 1 to FIG. 7.

Figure 9:
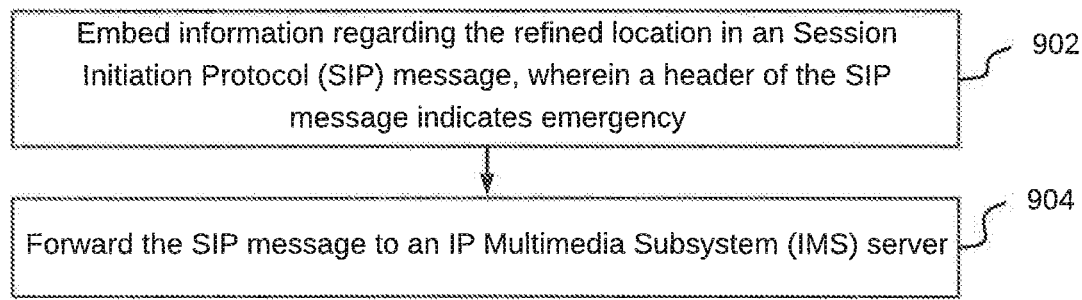
FIG. 9 illustrates a method of federating a refined location of a UE across a plurality of networks is illustrated, in accordance with an embodiment.

Referring now to FIG. 9, a flowchart of a method of federating a refined location of the UE across the plurality of networks is illustrated, in accordance with an embodiment. At step 902, information regarding the refined location is embedded in an SIP message, such that, a header of the SIP message indicates emergency. At step 904, the SIP message is sent to an IMS server. The method has already been explained in detail in conjunction with FIG. 1 to FIG. 7.

Figure 10:
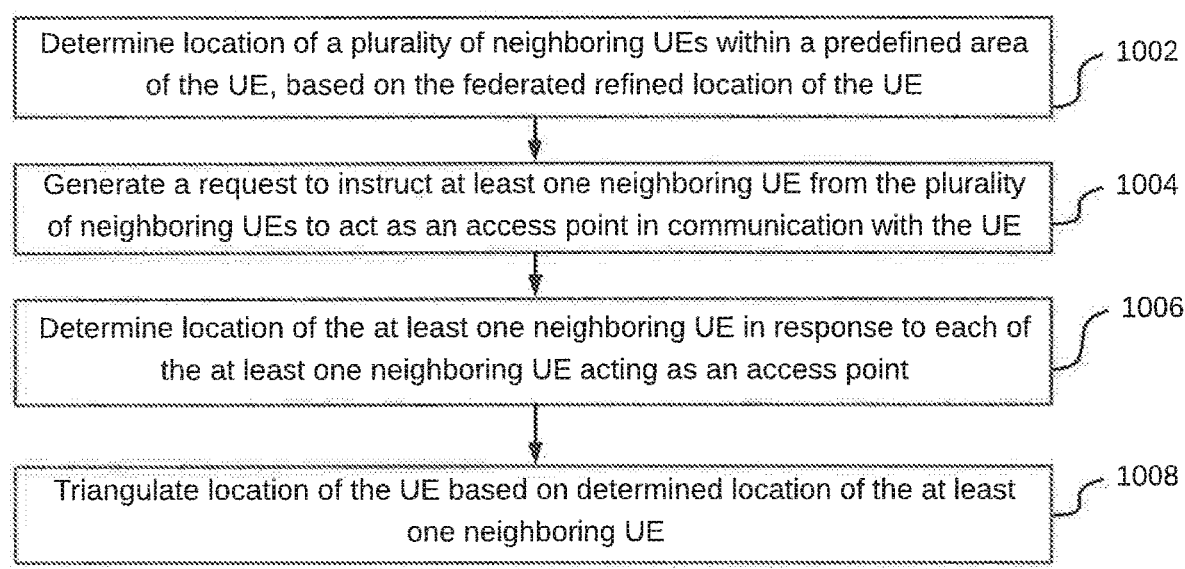
FIG. 10 illustrates a method for determining location of a UE, in accordance with an embodiment.

Referring now to FIG. 10, a method for determining location of a UE is illustrated, in accordance with an embodiment. Based on a federated refined location of the UE, location of a plurality of neighboring UEs within a predefined area of the UE is determined at step 1002. At step 1004, a request is generated to instruct one or more neighboring UEs from the plurality of neighboring UEs to act as an access point in communication with the UE. In response to each of the one or more neighboring UEs acting as access points, location of the one or more neighboring UEs is determined at step 1006. Thereafter, at step 1006, location of the UE is triangulated based on determined location of the one or more neighboring UEs. This has been explained in detail in conjunction with FIG. 7.

Figure 11:
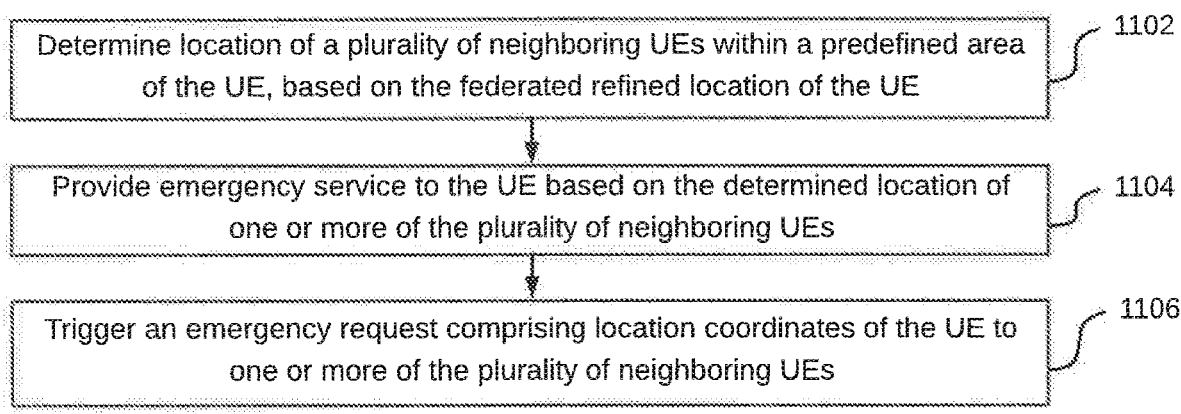
FIG. 11 illustrates a flowchart of a method of triggering an emergency request for a UE, in accordance with an embodiment.

Referring now to FIG. 11, a flowchart of a method of triggering an emergency request for a UE, in accordance with an embodiment. Based on a federated refined location of the UE, location of a plurality of neighboring UEs within a predefined area of the UE is determined at step 1102. At step 1104, emergency service to the UE is provided based on the determined location of one or more of the plurality of neighboring UEs. Thereafter, at step 1106, an emergency request (for providing necessary help), which includes location coordinates of the UE, is triggered to one or more of the plurality of neighboring UEs.

In an embodiment, multiple emergency trigger may be received from the same area, implying that a natural calamity may have occurred in that area. In such cases, available CCTV footages of the area may be leveraged to confirm whether an emergency has occurred or not. Thereafter, civic authorities of the area may be informed accordingly in order to immediately provide the required help. When the affected area is large in size, the civic authorities and emergency helplines of neighboring areas (which are unaffected by emergency) may also be informed about the natural calamity.

Figure 12:
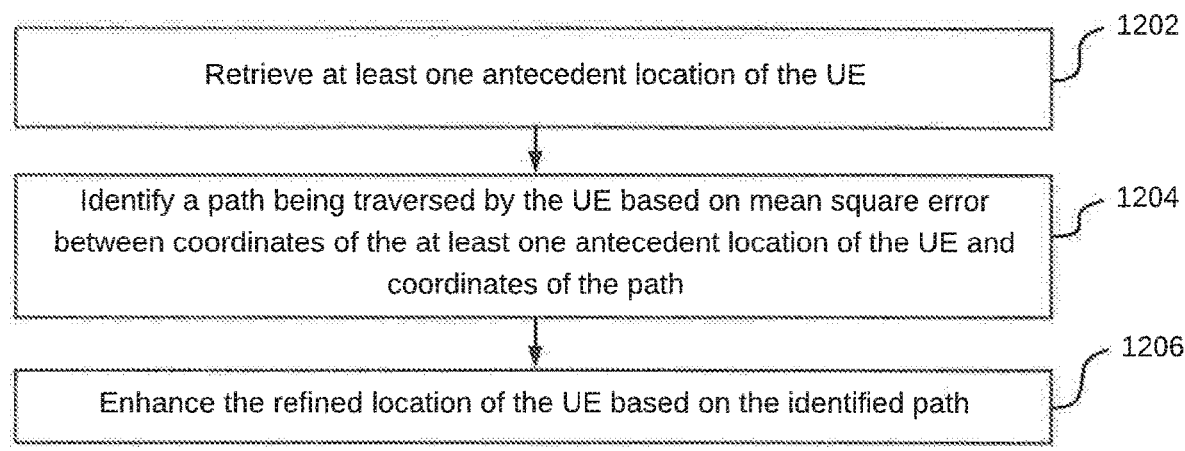
FIG. 12 illustrates a flowchart of a method for enhancing a refined location of a UE, in accordance with an embodiment.

Referring now to FIG. 12, a flowchart of a method for enhancing a refined location of a UE is illustrated, in accordance with an embodiment. The method may be applicable to each of the implementations 102, 104, and 106. An owner of the UE may be a victim of an emergency. The refined location identified during emergency may have an error quotient, which might be deceptive and oftentimes may lead to a wrong location. At step 1202, one or more antecedent locations of the UE may be retrieved. A safety application installed in the UE may register the one or more antecedent locations with an emergency trigger message. This data can also be requested from a parent network provider of the UE, which has details of the UE's one or more antecedent locations of at least the last one day.

At step 1204, a path being traversed by the UE is identified based on mean square error between coordinates of the one or more antecedent locations of the UE and coordinates of the path. To this end, the one or more antecedent locations are aligned with a topography map of the area, for which the one or more locations were determined. A map of the area and coordinates of different available paths in the area are retrieved. Coordinates of the one or more antecedent locations are then compared with coordinates of all available paths of the area. Thereafter, the Mean Square Error between the coordinates of the one or more antecedent locations and the coordinates of all the available paths is calculated. In other words, the mean square error is computed for all available paths. The path that has the least mean square error may be identified as the path traversed by the UE. At step 1206, the refined location of the UE is enhanced based on the identified path. Once the path traversed by the user is identified, the location of the emergency trigger is mapped to the path traversed. Coordinate on the traversed path, which have the minimum distance from the coordinates of the emergency trigger, is used to enhance the refined location of the UE.

In an embodiment, the method may also identify a side of the traffic divider, where the emergency occurred. To this end, the direction of movement of the UE is identified based on shift of coordinates the one or more antecedent locations with time. Once the direction of movement of the UE is determined, the side of the traffic divider may be identified on the basis of a roadmap of the area.

In an embodiment, when a UE (which may be a victim) is moving and cannot be traced actively, an estimate of the trajectory that may have been followed by the UE may be made, in order to compensate for the lag between the emergency trigger and rescue action. To this end, historical location data (or velocity data) of UEs on a given path is determined for statistics and dividing the path into grids. The speed of the vehicles in these grids may be assumed to be constant. The speed of the UE in these grids by may be calculated using antecedent location and timestamps of the UE. The speed may then be compared with average speed of the vehicles on the path. Thereafter, an approximate bias between speed of the UE and average speed of other UEs may be determined as d. Based on value of the bias, i.e., d, and time elapsed, an estimate of the current location of the UE may be determined. In an exemplary embodiment, a UE may have triggered an emergency call at given point and prediction of UEs location needs to be after T seconds. The distance traversed by the UE in time T may be determined using the equation (2) given below:

$$\sum xi \text{ Where} \left| \sum \left( \frac{vi+d}{xi} \right) - T \right| \quad (2)$$

where,
xi is the distance traversed by the UE after T seconds,
vi is the average speed of vehicle of the UE, and
d is the different between an average speed of the UE and the average speed of the vehicle.

If the traversed distance is substantially different from the previous distances traversed by the U, then it is more probable that the UE is either static or the UEs mode of motion has changed. This may imply, for example, that the owner of the UE is being dragged away or is asked to get down from his car.

In an embodiment, in an area from where an emergency was triggered, the movement of other UEs (who have registered for safety application) may be tracked to analyze mobility trajectory and average speed. Inference may be drawn from movement of other UEs to determine the real-time traffic of the area when the emergency happened. The movement pattern and speed of other UEs may help in getting a gist about the real-time traffic and detect possible anomalies in the area. By way of an example, if there is an aberrant movement observed or if there is sudden slowdown in traffic in the area in comparison with the normal traffic pattern of the area, it will reinforce the location calculation as well as help in understanding the severity and type of the incident. Call details of other UEs in the area of emergency may also be analyzed to determine whether a call was made to a local emergency body.

Figure 13:
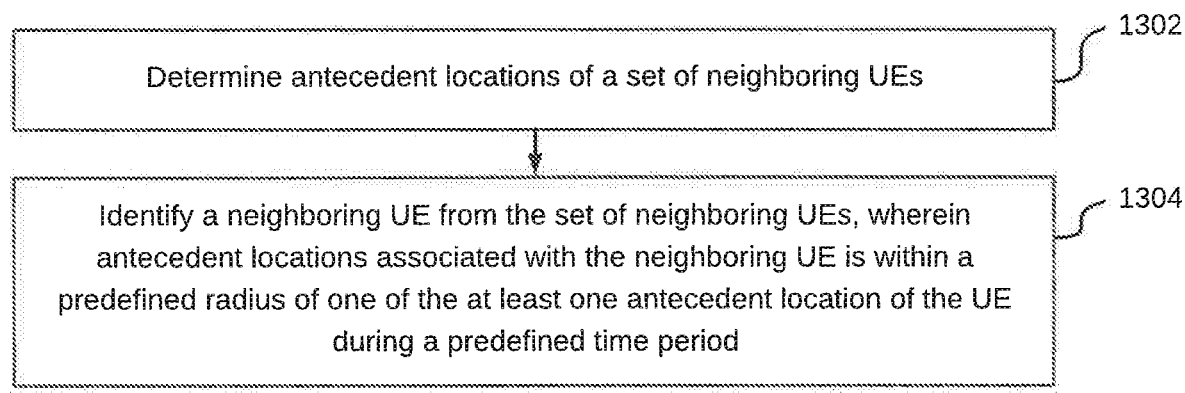
FIG. 13 illustrates a flowchart of a method of identifying a neighboring UE as a perpetrator of an emergency associated with a UE is illustrated, in accordance with an embodiment.

Referring now to FIG. 13, a flowchart of a method of identifying a neighboring UE as a perpetrator of an emergency associated with a UE is illustrated, in accordance with an embodiment. At step 1302, antecedent locations of a set of neighboring UEs is determining. At step 1304, a neighboring UE is identified from the set of neighboring UEs. Antecedent locations associated with the neighboring UE is within a predefined radius of one of the one or more antecedent locations of the UE during a predefined time period. By way of an example, when the UE may be thrown away or may get separated from the owner after an emergency was triggered, tracking of the UE may not be helpful. In this situation, other UEs that were in the proximity of the UE during the emergency trigger and were travelling in the same direction as the UE for a certain period of time and with the same speed, are tracked. As a result, a list of suspect may be generated using which, the UE's owner can be tracked. The movement pattern of the other UEs may be tracked and analyzed to identify a perpetrator/offender. By way of another example, in the above scenario, an owner of the UE may use an ED (for example, the ED 120 or the ED 132) to trigger an emergency without being noticed and with minimal effort. When the UE has been thrown away from the ED and the owner is not able to trigger an emergency from the ED, a safety application in the ED may trigger the emergency by latching on to the other UEs that are nearby the UE and are registered with the safety application to trigger the emergency call irrespective of the service provider. By way of yet another example, an owner of a UE from which an emergency was triggered, may be indoor location of that UE may not be traceable. In this case, another UE that may be moving within a proximity of the owner may be traced to get the location of the owner.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and system for federating location of point of emergency across networks. The method uses the last known location, topography of the area, and the present traffic condition of the area, to determine an accurate location of the area. The method also improves location accuracy by seeking help from devices of passerby (by turning their device into wireless APs). The method also improves location accuracy of an IP devices connected to the non-3GPP access network (Wi-Fi). The device (LSO) federates the emergency information to secondary users of other service providers, who are closer to the emergency area along with the subscribed secondary users of the victim in emergency. An external device is also provided, which may trigger emergency by connecting to a UE via Bluetooth or Wi-Fi etc. The architecture is thus capable of handling multiple types of emergencies (for example, accident, natural disaster, asset theft, an intentional crime or harm to a person in emergency).

The specification has described method and system for federating location of point of emergency across networks. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium"

should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of federating location of a point of emergency across a plurality of networks, the method comprising:
    receiving, by a Location Service Orchestrator (LSO), an emergency alert from a User Equipment (UE), wherein the UE is communicatively coupled with a first network from the plurality of networks;
    creating, by the LSO, a blind zone database comprising information associated with geographical areas receiving zero coverage from the first network, based on reports received from the UE;
    determining, by the LSO, a location of the UE using the blind zone database, based on the received emergency alert;
    refining, by the LSO, the determined location based on a network initiated location determination mechanism of the first network, when the accuracy of determined location of the UE is below a pre-defined threshold for locational accuracy; and
    federating, by the LSO, the refined location of the UE across the plurality of networks.

2. The method of claim 1, wherein the refined location is federated across the plurality of networks through an LSO-Gateway (LSO-GW) associated with the LSO.

3. The method of claim 2, wherein the LSO-GW is one of a distributed LSO-GW and a centralized LSO-GW, and wherein the distributed LSO-GW is located within an associated LSO, and wherein the centralized LSO-GW is communicatively coupled to LSOs associated with the plurality of networks and facilitates communication amongst the LSOs.

4. The method of claim 1, wherein federating comprises:
    embedding information regarding the refined location in a Session Initiation Protocol (SIP) message, wherein a header of the SIP message indicates emergency; and
    forwarding the SIP message to an IP Multimedia Subsystem (IMS) server.

5. The method of claim 1, further comprising determining location of a plurality of neighboring UEs within a pre-defined area of the UE, based on the federated refined location of the UE.

6. The method of claim 5, further comprising:
    generating a request to instruct at least one neighboring UE from the plurality of neighboring UEs to act as an access point in communication with the UE;
    determining location of the at least one neighboring UE in response to each of the at least one neighboring UE acting as an access point; and
    triangulating location of the UE based on determined location of the at least one neighboring UE.

7. The method of claim 5, further comprising providing emergency service to the UE based on the determined location of one or more of the plurality of neighboring UEs.

8. The method of claim 7, further comprising triggering an emergency request comprising location coordinates of the UE to one or more of the plurality of neighboring UEs.

9. The method of claim 1, wherein the emergency alert is generated by the UE in response to a trigger received from an external device communicatively coupled to the UE, wherein the external device is configured to detect an emergency situation.

10. The method of claim 1, wherein the first network is one of a 3rd Generation Partnership Project (3GPP) network, a non-3GPP network, and a Wi-Fi network.

11. The method of claim 1, wherein the network initiated location determination mechanism is implemented in one of a Multi-access Edge Computing (MEC) safety application server and a non-MEC safety application server.

12. The method of claim 11 further comprising:
    determining antecedent locations of a set of neighboring UEs;
    identifying a neighboring UE from the set of neighboring UEs, wherein antecedent locations associated with the neighboring UE is within a predefined radius of one of the at least one antecedent location of the UE during a predefined time period.

13. The method of claim 1 further comprising:
    retrieving at least one antecedent location of the UE;
    identifying a path being traversed by the UE based on mean square error between coordinates of the at least one antecedent location of the UE and coordinates of the path; and
    enhancing the refined location of the UE based on the identified path.

14. The system of claim 1, wherein the processor instructions further cause the processor to:
    retrieve at least one antecedent location of the UE;
    identify a path being traversed by the UE based on mean square error between coordinates of the at least one antecedent location of the UE and coordinates of the path; and
    enhance the refined location of the UE based on the identified path.

15. The system of claim 14, wherein the processor instructions further cause the processor to:
    determine antecedent locations of a set of neighboring UEs;
    identify a neighboring UE from the set of neighboring UEs, wherein antecedent locations associated with the neighboring UE is within a predefined radius of one of the at least one antecedent location of the UE during a predefined time period.

16. A system comprising a Location Service Orchestrator (LSO) for federating location of a point of emergency across a plurality of networks, the system comprising:
    a processor; and
    a memory communicatively coupled to the processor, wherein the memory stores processor instructions, which, on execution, causes the processor to:
        receive an emergency alert from a User Equipment (UE), wherein the UE is communicatively coupled with a first network from the plurality of networks;
        create a blind zone database comprising information associated with geographical areas receiving zero coverage from the first network, based on reports received from the UE;
        determine a location of the UE using the blind zone database, based on the received emergency alert;
        refine the determined location based on a network initiated location determination mechanism of the first network, when the accuracy of determined location of the UE is below a pre-defined threshold for locational accuracy; and federate the refined location of the UE across the plurality of networks.

17. The system of claim 16, wherein the refined location is federated across the plurality of networks through an LSO-Gateway (LSO-GW) associated with the LSO.

18. The system of claim 17, wherein the LSO-GW is one of a distributed LSO-GW and a centralized LSO-GW, and wherein the distributed LSO-GW is located within an associated LSO, and wherein the centralized LSO-GW is communicatively coupled to LSOs associated with the plurality of networks and facilitates communication amongst the LSOs.

19. The system of claim 16, wherein to federate, the processor instructions further cause the processor to:
 embed information regarding the refined location in an Session Initiation Protocol (SIP) message, wherein a header of the SIP message indicates emergency; and
 forward the SIP message to an IP Multimedia Subsystem (IMS) server.

20. The system of claim 16, wherein the processor instructions further cause the processor to determine location of a plurality of neighboring UEs within a predefined area of the UE, based on the federated refined location of the UE.

21. The system of claim 20, wherein the processor instructions further cause the processor to:
 generate a request to instruct at least one neighboring UE from the plurality of neighboring UEs to act as an access point in communication with the UE;
 determine location of the at least one neighboring UE in response to each of the at least one neighboring UE acting as an access point; and
 triangulate location of the UE based on determined location of the at least one neighboring UE.

22. The system of claim 20, wherein the processor instructions further cause the processor to provide emergency service to the UE based on the determined location of one or more of the plurality of neighboring UEs.

23. The system of claim 22, wherein the processor instructions further cause the processor to trigger an emergency request comprising location coordinates of the UE to one or more of the plurality of neighboring UEs.

24. The system of claim 16, wherein the emergency alert is generated by the UE in response to a trigger received from an external device communicatively coupled to the UE, wherein the external device is configured to detect an emergency situation.

25. The system of claim 16, wherein the first network is one of a 3rd Generation Partnership Project (3GPP) network, a non-3GPP network, and a Wi-Fi network.

26. The system of claim 16, wherein the network initiated location determination mechanism is implemented in one of a Multi-access Edge Computing (MEC) safety application server and a non-MEC safety application server.

27. A non-transitory computer-readable storage medium having stored thereon, a set of computer-executable instructions for federating location of a point of emergency across a plurality of networks, which upon execution cause a computer comprising one or more processors to perform steps comprising:
 receiving an emergency alert from a User Equipment (UE), wherein the UE is communicatively coupled with a first network from the plurality of networks;
 creating a blind zone database comprising information associated with geographical areas receiving zero coverage from the first network, based on reports received from the UE;
 determining a location of the UE using the blind zone database, based on the received emergency alert;
 refining the determined location based on a network initiated location determination mechanism of the first network, when the accuracy of determined location of the UE is below a pre-defined threshold for locational accuracy; and
 federating the refined location of the UE across the plurality of networks.

* * * * *